3,450,464
**OPTICAL ANAMORPHIC SYSTEMS FOR JUSTIFI-
         CATION OF PRINTED TEXT LINES**
René M. P. Guffon, Paris, France, assignor to Ateliers
 Bariquand & Marre, Societe Anonyme, Arcueil, Val-
 de-Marne, France
      Filed Oct. 19, 1965, Ser. No. 497,743
Claims priority, application France, Mar. 9, 1965,
                       8,457
            Int. Cl. G02b *13/10*
U.S. Cl. 350—182                              6 Claims

ABSTRACT OF THE DISCLOSURE

An optical anamorphic system comprising two lenses placed on a common optical axis and two adjacent wedge prisms disposed between said two lenses and having parallel vertices disposed on either side of said common optical axis of the lenses, said prisms being rotatably mounted about first axes parallel to their vertices to allow the justification of the text lines with a single position of the initial point of the lines of which the image is fixed and said prisms being also rotatably mounted about second axes parallel to the first axes to permit to change at will the position of the initial point of the line of which the image will be fixed irrespective of the justification to which this line is subjected.

---

The present invention relates to improvements in optical anamorphic systems intended for photo-composition purposes, notably in anamorphic systems intended for the justification of printed text lines.

A device described in the U.S. Patent No. 2,939,370 patented on June 7, 1960, is already known which serves the purpose of altering the length of lines from a fixed point common to all the lines, this implying the initial alignment of the anamorphosed lines. The position of this fixed point, to which no anamorphic effect is applied, is determined by construction of the device.

As a result, any other point of the text line which lies between this fixed point and the end of the line is shifted to the right (or to the left), according as the anamorphic effect increases or decreases the length of the text line to bring same to the value selected as a common measure for the justified lines.

Although it can be disregarded as long as its value remains moderate, this shift of the initial point of the lines set as "indention," such as the initial portion of paragraphs, the so-called "reverse indentions," the indented citations, etc. after justification becomes objectionable as soon as the reinforcement attains higher values.

It is the scope of the present invention to provide simple adjustment means for permitting the mobility of the position of the point of the original where the anamorphic effect common to all the lines has zero value, without resorting to the expedient consisting for example in shifting laterally and simultaneously the original and the photographic film in relation to the optical device. According to another practical application of this improvement it is possible to effect the justification of the lines composed on two columns of a same page without having to shift either the original or the photographic film.

The device according to this invention comprising two optical lenses so shaped and disposed that the plane of the text to be justified can be placed in the focal plane of a first lens and that the plane of the photographic film can be placed in the focal plane of the second lens, whereby the light rays run parallel or substantially parallel between the two lenses, and two adjacent wedge prisms disposed between said two lenses and having parallel vertices disposed on either side of the common optical axis of said lenses, said prisms being rotatably mounted on first axes parallel to their vertices aforesaid and perpendicular to said optical axis, said prisms being further mechanically interconnected so as to rotate simultaneously but in opposite directions, is characterized in that the two prisms are also rotatably mounted either about their said first axes or about separate second axes parallel to said first axes, so that they can be brought to a position of zero justification effect for the beam of parallel light rays issuing from the first lens and emitted from a selected point of the document of which the image must be fixed irrespective of the length of the line to be justified and of which said point is an integral part.

The position of the point of said document, of which the image is fixed, is determined by simply altering the angular position or setting of said prisms with respect to the optical axis in the zero justification position.

In order to simplify the calculation of the optical component elements of the apparatus, it is convenient to so arrange the prisms, when they are in their zero justification position, that the first prism gives the minimum deflection to the beam of light rays issuing from the first lens and emitted from the selected point of which the image must be fixed, and that the second prisms proper gives the minimum deflection for the same beam issuing from the first prism. Thus, the two prisms will rotate in the same direction and through a same angle in relation to the optical axis when subsequently changing the origin of the lines to be justified, of which the image is to be fixed. As already explained hereinabove, this rotation may take place either about said first axes of the prisms or about one or two independent axes parallel to the first axes of said prisms.

According to a specific and preferred form of embodiment of the optical anamorphic system of this invention, the set of two prisms aforesaid is rotatably mounted as a unit about an axis parallel to the separate axes of rotation of said prisms, so that to each angle of rotation of the prism assembly there corresponds a different point of the document, such that the prisms be in a zero justification position in relation to the beam of parallel rays issuing from said point and passing through the first lens, and that the corresponding image point be fixed irrespective of the length of the line to be justified and of which said point of the document is an integral part.

It is stated hereinabove that the anamorphic device operates with parallel or substantially parallel light emission, this tolerance being utilized to permit, independently of the justifying horizontal distortion, certain variations in the type values, by continuously varying the reproduction scale within limits corresponding in practice to photo-composition requirements.

Under these conditions it is clear that the device according to this invention permits of modifying at will the origin of the lines to be justified of which the image must be fixed.

In order to afford a clearer understanding of this invention and of the manner in which the same may be carried out in practice, reference will now be made to the accompanying drawings, in which.

The two wedge prisms $P_1$ and $P_2$ are pivotally mounted about two axes $X_1$ and $X_2$ parallel to the vertices $a_1$ and $l_2$ of the prisms.

Figure 1:
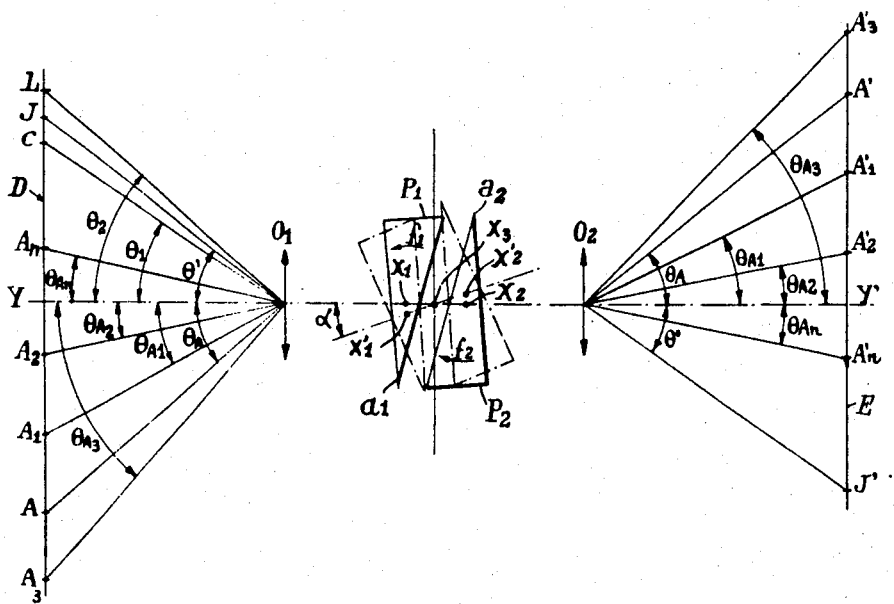
FIGURE 1 is a diagram illustrating the principle of the optical anamorphic system of this invention.

The stigmatism conditions make it necessary to operate this assembly with parallel or substantially parallel light beams, thus requiring the coupling of the two lenses $O_1$ and $O_2$ having focal length $f_1$ and $f_2$ on either side of the set of prisms $P_1$ and $P_2$. The axes of rotation $X_1$ and $X_2$ of these prisms, in the specific form of embodiment illustrated, lie on the optical axis Y–Y' of the optical system consisting of said two lenses. A document D carrying the text lines to be reproduced with the desired justification is disposed in the focal plane of lens $O_1$ and a photographic emulsion E is disposed in the image focal plane of lens $O_2$ (see FIGURE 1).

Assuming that the prisms $P_1$ and $P_2$ are in the position shown in thick lines, the point A of document D as seen from the centre of the lens $O_1$ at an angle $\theta_A$ in relation to the optical axis represents the origin of the lines to be reproduced of which the image A' as seen from the centre of lens $O_2$ at an angle $\theta_A$ in relation to the optical axis is fixed on the film E, irrespective of the justification to which this line is subjected, that is, irrespective of the length of this line.

This point A is such that in the specific example illustrated when the justification effect is zero and the prism $P_1$ is positioned to give the minimum deflection to the parallel-ray light beam emitted from A and issuing from $O_1$; the prism $P_2$ on the other hand is in its position giving the minimum deflection to the same beam after its refraction by $P_1$.

AC and AL designate respectively the short lines and the long lines to be justified according to a mean value shown at AJ. Points C, L and J are seen from the centre of lens $O_1$ at angles $\theta_1$, $\theta_2$ and $\theta'$ respectively. The distance CL is the justification zone.

The prisms $P_1$ and $P_2$ being in the position shown in thick lines, the image of J is J' when seen from the centre of $O_2$ at an angle $\theta'$. The justification consists in moving to J' the image of all the line ends lying between C and L. For lines having a length AJ the device is equivalent to a parallel-faced plate and will neither elongate nor shorten the line image. The ratio A'J'/AJ is equal to the magnification of the reproduction lens; therefore, in the example considered herein, $G = f_2/f_1$.

As stated in the aforesaid U.S. Patent No. 2,939,370 the justification of lines ending at a point lying between C and L is obtained by simultaneously rotating the prisms $P_1$ and $P_2$ about their axes $X_1$ and $X_2$ in opposite directions, for example in the direction of the arrows $f_1$ and $f_2$ by means of a suitable mechanism. During this prism rotation the image A' of point A, which is the beginning of all the justified lines, remains fixed. Switching from a line shortening effect to a line elongating effect is obtained by pivoting the prisms in directions opposite to those used initially.

The position of axes $X_1$ and $X_2$ as shown on the optical axis Y–Y' is not a critical requirement, for only the angular setting of the prisms is essential.

Of course, instead of taking AJ as a common measure of all the lines, AC and AL could be taken, and in this case all the lines should be shortened or elongated by the device.

It may be remarked here that the anamorphic effect produced by this device is developed only in the direction of the line and that the height of the types remains constant.

It is the object of the present invention to provide improvements and modifications in the known device briefly described hereinabove, for changing at will the origin of the lines to be justified of which the image must be fixed on the photographic emulsion.

From the foregoing it appears that to obtain a fixedness of the beginning of the justified lines corresponding to lines of the original beginning at points other than A which lie at variable distances from the optical axis, such as $A_1$, $A_2$, $A_3$ ... $A_n$, the prisms $P_1$ and $P_2$ must be so disposed that they are in a zero justification effect position or, in other words, in the specific case selected at the minimum deflection position for the parallel beams emitted from points $A_1$, $A_2$, $A_3$ ... $A_n$ according to cases and issuing from the first lens $O_1$, before any anamorphic effect, that is, before any relative rotation of the two prisms in relation to each other about their axes $X_1$ and $X_2$.

This requirement according to the present invention is met by mounting the assembly consisting of the two rotary prisms about an axis $X_3$ parallel to said axes $X_1$ and $X_2$, and lying in their plane in the case illustrated in the drawings, and the method consists in varying the angle $\alpha$ formed between this plane and the optical axis Y–Y' by bodily rotating the two prisms about the axis $X_3$ in order to set these prisms in their minimum distortion position according to the specific case contemplated for the parallel beam issuing from $A_1$, $A_2$ ... $A_n$ and having passed through the lens $O_1$. In the particularly simple case illustrated in the drawings the axis $X_3$ is disposed between $X_1$ and $X_2$ and equally spaced from these two axes, but this is not a critical requirement. The prism assembly thus rotated through an angle $\alpha$ is shown in chain-dotted lines in FIGURE 1, the separate axes of rotation of these prisms being then designated by the symbols $X'_1$ and $X'_2$.

For each new beginning of text line contemplated the suitable angle of rotation $\alpha$ of the set of prisms is that whereat the image of said beginning or initial point of the text line remains fixed on the photographic emulsion to which a ground glass plate is substituted for the focusing operation when pivoting the two prisms in relation to each other about their axes $X_1$ and $X_2$. The various text line beginnings are seen at angles $\theta_A$, $\theta_{A2}$, $\theta_{A3}$ ... $\theta_{An}$ from the centre of lens $O_1$, and the corresponding fixed images are seen at the same angles from the centre of lens $O_2$.

Figure 4:
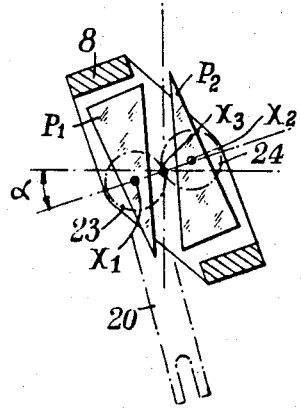
FIGURE 4 is a detail view showing the inverted-motion device in horizontal section.
Figure 2:
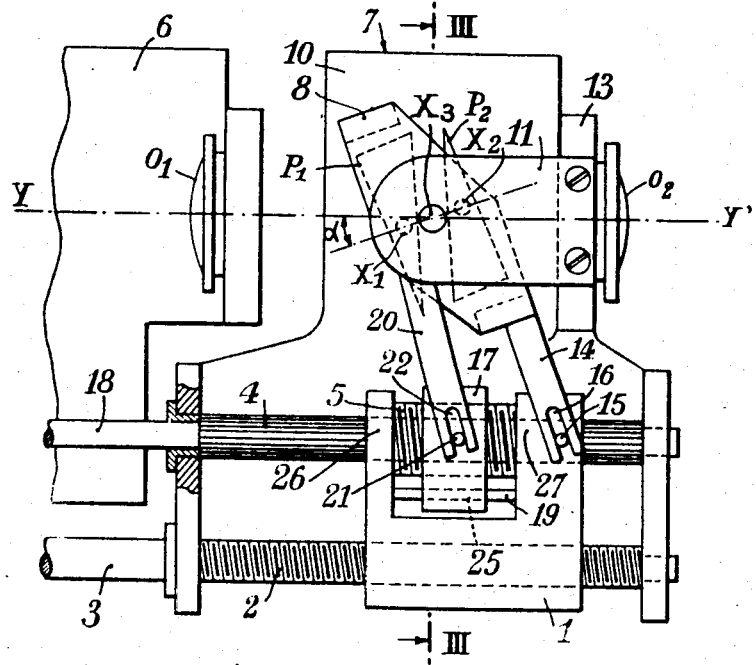
FIGURE 2 is a fragmentary plan view from beneath of a specific form of embodiment of the device of this invention, the toothed wheels carried by the prisms being omitted to simplify the drawing.
Figure 3:
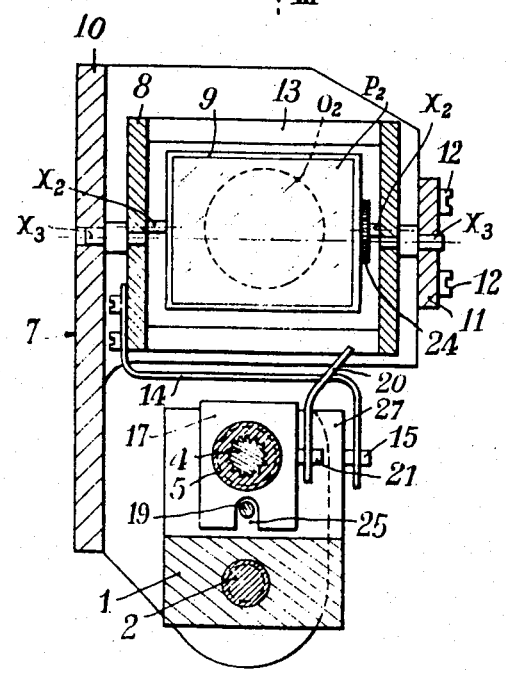
FIGURE 3 is a section taken upon the line III—III of FIGURE 2, without omitting said toothed wheels.

FIGURES 2 to 4 illustrate a specific form of embodiment of a justification device constructed according to the principle set forth hereinabove.

The apparatus comprises a carriage 1 adapted to be moved by translation along a screw rod 2 rotatably driven by a shaft 3 provided with a manual control knob (not shown). The carriage 1, when travelling along the screw rod 2, slides at the same time along a splined shaft 4 parallel to and level with the screw rod 2, this sliding movement being obtained by means of an internally splined and externally screw-threaded member 5 mounted between two end flanges 26 and 27 of carriage 1.

A lens $O_1$ is mounted on the so-called front carriage 6 separate from the other parts of the device and adapted to travel along the optical axis Y–Y' under the control of mechanical means not shown.

The screw rod 2 and splined shaft 4 are mounted parallel to the optical axis Y–Y' so that the carriage 1 is adapted to make movements of translation in a direction parallel to this axis.

Another lens $O_2$ is mounted on another carriage 7 called rear carriage and also adapted to travel along the axis Y–Y' under the control of mechanical means (not shown) this carriage 7 carrying the above-described device consisting of the carriage 1, screw rod 2 and splined shaft 4, as well as two prisms $P_1$ and $P_2$ mounted in a cage 8 comprising an upper plate and a lower plate interconnected by a pair of lateral uprights. Each prism is set in a frame mounting 9 rigid with an upper pivot and a lower pivot coincident each with the separate axis of rotation of these prisms, respectively $X_1$ or $X_2$ according to the case, and trunnioned respectively in the upper plate and in the lower plate of said cage 8 (see FIGURE 3).

These two plates are themselves provided with two pivots coincident with or concentric to the axis of rotation $X_3$ of the prism assembly, said pivots being trunnioned on the one hand in a base plate 10 of said carriage 7 and, on the other hand, in an upper plate 11 of said carriage which has one edge secured by means of screws 12 to the upper edge of a member 13 secured at right angles to the base plate 10 of carriage 7. As illustrated in FIGURE 2, the axis $X_3$ lies in the plane containing both axes $X_1$ and $X_2$.

The position of the front and rear carriages 6 and 7 along the optical axis Y–Y' is so adjusted that the document D lies in the focal plane of lens $O_1$ and that the photographic emulsion E lies in the focal plane of lens $O_2$.

An arm 14 rigid with the cage 8 in which the prisms are mounted is connected to the carriage 1 by engaging with its forked end 16 a pin 15 rigid with the carriage.

The movement of translation of carriage 1 which is controlled by the shaft 3 causes the prism cage 8 to pivot about the axis $X_3$. Thus, the prisms can be moved to the position shown in FIGURES 2 to 4 wherein the plane containing the axes $X_1$, $X_2$, $X_3$ is at an angle $\alpha$ with respect to the optical axis Y–Y'.

A nut 17 engages the screw rod 5 and is thus adapted to move axially therealong when the splined shaft 4 and therefore the screw member 5 are rotatably driven from the shaft 18 provided with a manual control knob (not shown). The nut 17 is guided during this movement of translation by a small shaft 19 mounted on the carriage 1 between the flanges 26 and 27, and slidably engaging a passage 25 formed through the nut 17.

Another lever 20 rigid with the frame mounting of prism $P_1$ connects same to said nut 17 by means of a stud or pin 21 rigid with said nut and engaged by the forked end 22 of said other arm 20. The prisms $P_1$ and $P_2$ are solid respectively with toothed wheels 23 and 24 centered and secured on the pivot pins corresponding to axes $X_1$ and $X_2$, and in relative meshing engagement (see FIGURE 4).

For each value of angle $\alpha$ the simultaneous movement of rotation of prisms $P_1$ and $P_2$ in relation to each other in opposite directions is obtained as follows:

Carriage 1 is held against motion and shaft 18 actuated to cause the translation of nut 17 along screw member 5, the latter being thus rotatably driven but held against axial translation; this movement of translation of nut 17 actuates the arm 20 causing the rotation of prism $P_1$ and therefore of its toothed wheel 23, thus driving in turn in the opposite direction the toothed wheel 24 and therefore the prism $P_2$ rigid therewith.

To determine the angle $\alpha$ adapted to give a fixed image of point $A_n$ representing the beginning of the lines to be justified, the shaft 3 is gradually moved and for each new value of the angle thus obtained the shaft 18 is actuated in order to check, for example on a ground glass plate substituted for the photographic film, whether the image $A'n$ is fixed. When this image is fixed, the angle $\alpha$ has assumed a suitable value and it is then possible to effect the justification of the text lines having their origin at $A_n$ by acting only upon the shaft 18 controlling the relative rotation of the two prisms. During this operation proper guidance is obtained by checking on the ground glass plate the position of the image of the end of the justified line, the required position being indicated by a reference line carried by said glass plate.

Of course, the mechanical means described hereinabove are given by way of example only and should not be construed as limiting the present invention since any equivalent mechanical means may be contemplated for rotatably driving the prisms with respect to the optical axis of the apparatus as well as the relative rotation of the prisms in opposite directions, without departing from the spirit and scope of the invention as set forth in the appended claims.

What I claim is:
1. An optical anamorphic system intended or the justification of text lines projected onto a photographic film, said system comprising two lenses placed on a common optical axis and disposed with the plane of the text to be justified in the focal plane of the first lens and the plane of the photographic film placed in the focal plane of the second lens, whereby the light rays from the text are collimated to run parallel between said two lenses, two adjacent wedge prisms disposed between said two lenses and having parallel vertices disposed on either side of said common optical axis of the lenses, means for rotating said prisms simultaneously in opposite directions about first axes parallel to their vertices and disposed at right angles to said optical axis, and means for rotating said prisms as a unit about a second axis parallel to said first axes, to fix the initial point of a line irrespective of justification.

2. An optical anamorphic system as in claim 1, wherein said means for rotating said prisms about said second axis rotates said prisms in the same direction and through the same angle with respect to said optical axis when another zero justification point is selected from said text, whereby both of said prisms will be in positions of minimum deflection at said zero justification point.

3. An optical system as in claim 2, wherein said means for rotating said prisms as a unit comprises a cage for rotatably mounting said prisms about said first axes, said cage being rotatable about said second axis, a carriage having a pin, a first arm having a forked end engaging said pin and a second end rigidly connected to said cage, and first mechanical means for translating said carriage parallel to said optical axis; whereby as said carriage is moved, said first arm pivots about said pin to rotate said cage about said second axis.

4. An optical system as in claim 3, further comprising a pair of meshing toothed wheels rigidly mounted on said prisms, respectively, a second mechanical means for movement parallel to said optical axis having a second pin, a second arm having a forked end engaging said second pin and a remaining end rigidly engaging one of said prisms; whereby as said second mechanical means is moved, said second arm and said prism connected thereto rotate, thereby said wheels drive the remaining prism in the opposite direction.

5. An optical system as in claim 4, wherein said second mechanical means comprises a screw rod, a nut having a screw threaded hole and a second parallel hole, said screw rod extending through said threaded hole and a guide shaft extending through said second hole parallel to said optical axis.

6. An optical system as in claim 5, wherein said screw rod is rotatably mounted on said carriage.

References Cited

UNITED STATES PATENTS

| | | |
|---|---|---|
| 2,764,908 | 10/1956 | Hendrix et al. |
| 2,792,741 | 5/1957 | Mazzon. |
| 2,939,370 | 6/1960 | Bouffilh _____ 95—4.5 |

DAVID SCHONBERG, *Primary Examiner.*

RONALD J. STERN, *Assistant Examiner.*

U.S. Cl. X.R.
95—4.5; 350—287